United States Patent
Wang et al.

(10) Patent No.: US 7,447,808 B2
(45) Date of Patent: Nov. 4, 2008

(54) METHOD FOR DATA TRANSMISSION BETWEEN AN INPUT-OUTPUT CARD WITH AN ADD-ON MEMORY CARD AND A HOST SYSTEM

(75) Inventors: Yao-Ming Wang, Hsinchu (TW); Shuh-Tai Lu, Hsinchu (TW); Jau-Jiu Ju, Hsinchu (TW); Der-Ray Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 177 days.

(21) Appl. No.: 10/753,465

(22) Filed: Jan. 9, 2004

(65) Prior Publication Data
US 2005/0097253 A1      May 5, 2005

(30) Foreign Application Priority Data
Oct. 31, 2003    (TW) ............................... 92130465 A

(51) Int. Cl.
*G06F 3/00*      (2006.01)
*G06F 13/12*     (2006.01)
*G06F 13/00*     (2006.01)

(52) U.S. Cl. ............................. 710/14; 710/38; 710/62; 710/301

(58) Field of Classification Search ................ 710/38
See application file for complete search history.

(56) References Cited

U.S. PATENT DOCUMENTS

| | | | | |
|---|---|---|---|---|
| 4,695,895 A | * | 9/1987 | Nagashima | 358/426.01 |
| 4,858,030 A | * | 8/1989 | Oku et al. | 386/71 |
| 6,381,662 B1 | * | 4/2002 | Harari et al. | 710/301 |
| 6,983,281 B1 | * | 1/2006 | Utsumi | 707/101 |
| 2002/0021596 A1 | * | 2/2002 | Rolandi | 365/200 |
| 2003/0093606 A1 | * | 5/2003 | Mambakkam et al. | 710/305 |
| 2004/0070952 A1 | * | 4/2004 | Higuchi et al. | 361/737 |

FOREIGN PATENT DOCUMENTS

WO      WO 02/19266 A2     3/2002

* cited by examiner

*Primary Examiner*—Alan Chen
(74) *Attorney, Agent, or Firm*—Birch, Stewart, Kolasch & Birch, LLP

(57) ABSTRACT

A method provides efficient data transmission between an input-output card with an add-on memory card and a host system. The input-output card carrying an inserted memory card is connected with the host system to improve the mechanical strength of the arrangement. An input-output controller on the input-output card controls a switch that switches between data buses. The memory card and the input-output card optionally share all data buses of the input-output card to transmit data with the host system, directly transmit data between each other, or respectively use a portion of them to achieve a better transmitting efficiency.

15 Claims, 4 Drawing Sheets

METHOD FOR DATA TRANSMISSION BETWEEN AN INPUT-OUTPUT CARD WITH AN ADD-ON MEMORY CARD AND A HOST SYSTEM

This Nonprovisional application claims priority under 35 U.S.C. § 119(a) on Patent Application No(s). 092130465 filed in TAIWAN on Oct. 31, 2003, the entire contents of which are hereby incorporated by reference.

FIELD OF THE INVENTION

The present invention relates to a data transmission method and particularly to a method for selective data transmission between an input-output card with a memory card and a host system.

BACKGROUND OF THE INVENTION

Portable digital devices such as PDA, notebooks, or cellular phones now combine several small memory cards to serve as the semiconductor storage media. The present prevailing specifications include CF (Compact Flash), SD (Security Digital), MMC (Multimedia Card), Smart Media and Memory Stick, etc. In order to expand the I/O (input-output) applications in the host system of the aforesaid portable digital devices such as input and output of image files or wireless transmission, some vendors have developed an IO card (input-output card) to further improve CF, SD and Memory Stick.

With the gradually increased retrieval memory capacity, the demand for additional memory of the IO card also grows.

One of the conventional methods for solving this problem is to add extra insertion slots on the host system to accommodate the memory card. FIG. 1 illustrates such an approach. The host system 100 has two insertion slots 101 and 102 to receive an IO card 103 and a memory card 104 respectively. However, since adding more insertion slots on the host systems also increases the size and cost, miniaturization is the trend for designing portable digital devices. Thus, since it is essential to reduce the number of insertion slots, there is a need to integrate the IO card and the memory card. Furthermore, multiple insertion slots incur another problem. Since the data transmission between the IO card 103 and the memory card 104 has to go through the data bus inside the host system 100, it is not possible to achieve a desirable transmitting efficiency.

The Combo card, which directly expands the memory capacity of the IO card, is one of the products that integrate the IO card and the memory card. However, since the integrated design limits the memory capacity, it cannot be replaced with a larger capacity memory card.

In order to expand the memory capacity without having additional insertion slots, Sandisk Co. and Socket Communication Co. together have disclosed a patent WO 02/19266 A2, in which they provide a data transmission method of connecting a non-volatile memory card of a host system to an external device. Their method includes an electrical and mechanical connection between the IO card and the memory card, and a data transmission between the memory card and the external device through the IO card. The IO card in the disclosed embodiment is a wireless transmitting card to provide radio transmission between the memory card and the external device.

The embodiment of the patent mentioned above is depicted in FIG. 2. A memory card 202 is inserted into an insertion slot 201 of a host system 200 while an IO card 203 is inserted into a tail end of the memory card 202 to establish the mechanical and electrical connection. Hence, data in the IO card 203 may be transmitted to the host system 200 through the memory card 202. As a result, the IO card and the memory card are integrated to have only one insertion slot.

However, in such a structure of data transmission, the function of the IO card controller is more complex than the memory card controller. Additional functions have to be added to the memory card controller to transmit data between the IO card and memory card and host system. Moreover, because the tail end of the memory card has to establish mechanical and electrical connection with the IO card, the memory card not only has to be made with specially specified dimensions, it is also not replaceable or interchangeable with the memory cards now available on the market.

In terms of performance, due to the performance differences between the controllers of the IO card and the memory card, the overall data transmitting efficiency is lowered. This problem has become a bottleneck for transmitting data among the IO card with integrated memory card and the host system. Moreover, since the memory card cannot be replaced nor interchanged as desired, its capacity cannot be expanded.

Furthermore, the size of the IO card is usually greater than the size of the memory card. Thus, connecting the IO card to the tail end of the memory card reduces the total mechanical coupling strength.

SUMMARY OF THE INVENTION

The present invention aims at resolving the problems occurred to the conventional techniques such as having a poor mechanical coupling strength between the IO card, memory card and host system, and a memory card that is not interchangeable or replaceable which results in an un-expandable memory capacity and an undesirable data transmitting efficiency.

The method for data transmission between an input-output card with a memory card and a host system according to the invention mainly includes inserting the memory card into the IO card and connecting the IO card to the host system. Then, the memory card and IO card, as well as the IO card and the host system, are both electrically and mechanically coupled. Finally, a bus control signal, through an IO controller on the IO card, is generated to control the transmitting path between the memory card and the host system so that switching between the first data bus and the second data bus in the IO card is tolerated.

By means of the structure set forth above, the invention not only forms a stronger coupling structure among the host system, IO card, and memory card, but also achieves an improved data transmitting efficiency.

Other objects, features and advantages of the invention will be apparent from the following detailed description, which proceeds with reference to the accompany drawings.

DESCRIPTION OF THE PREFERRED EMBODIMENTS

Figure 2:
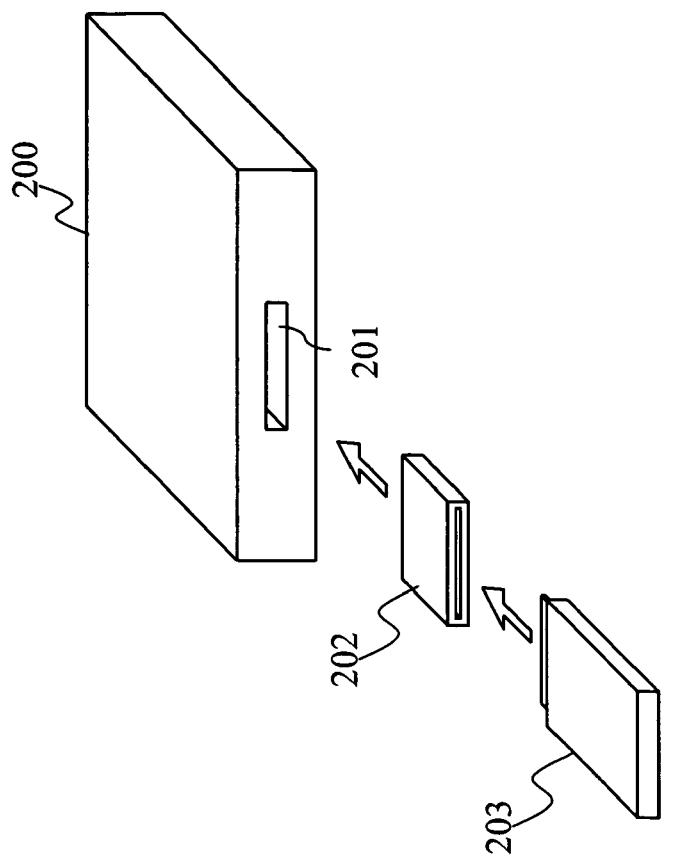
FIG. 2 is a schematic view of inserting a memory card to a host system, then coupling an IO card to the tail end of the memory card according to another conventional technique.
Figure 1:
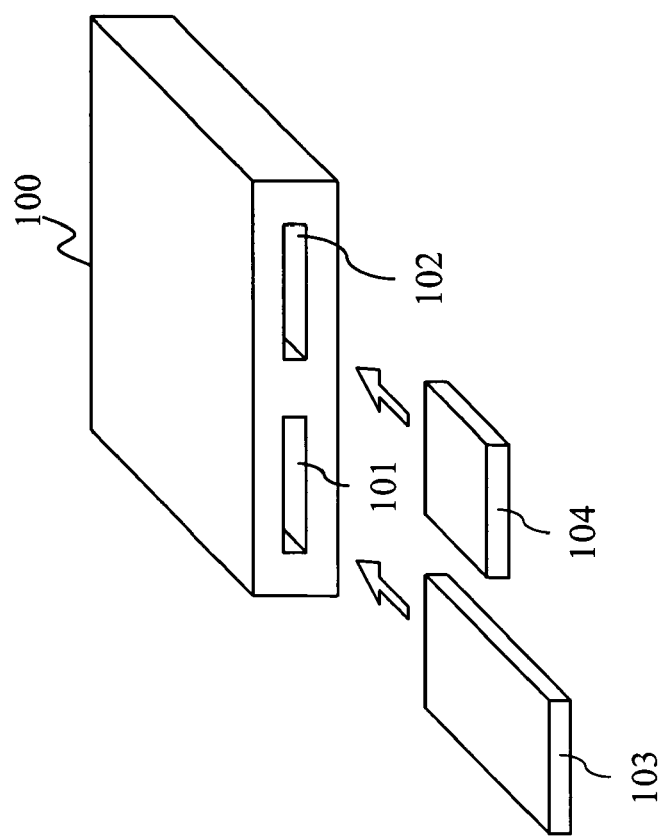
FIG. 1 is a schematic view of a host system coupling respectively to an IO card and a memory card according to a conventional technique.
Figure 3:
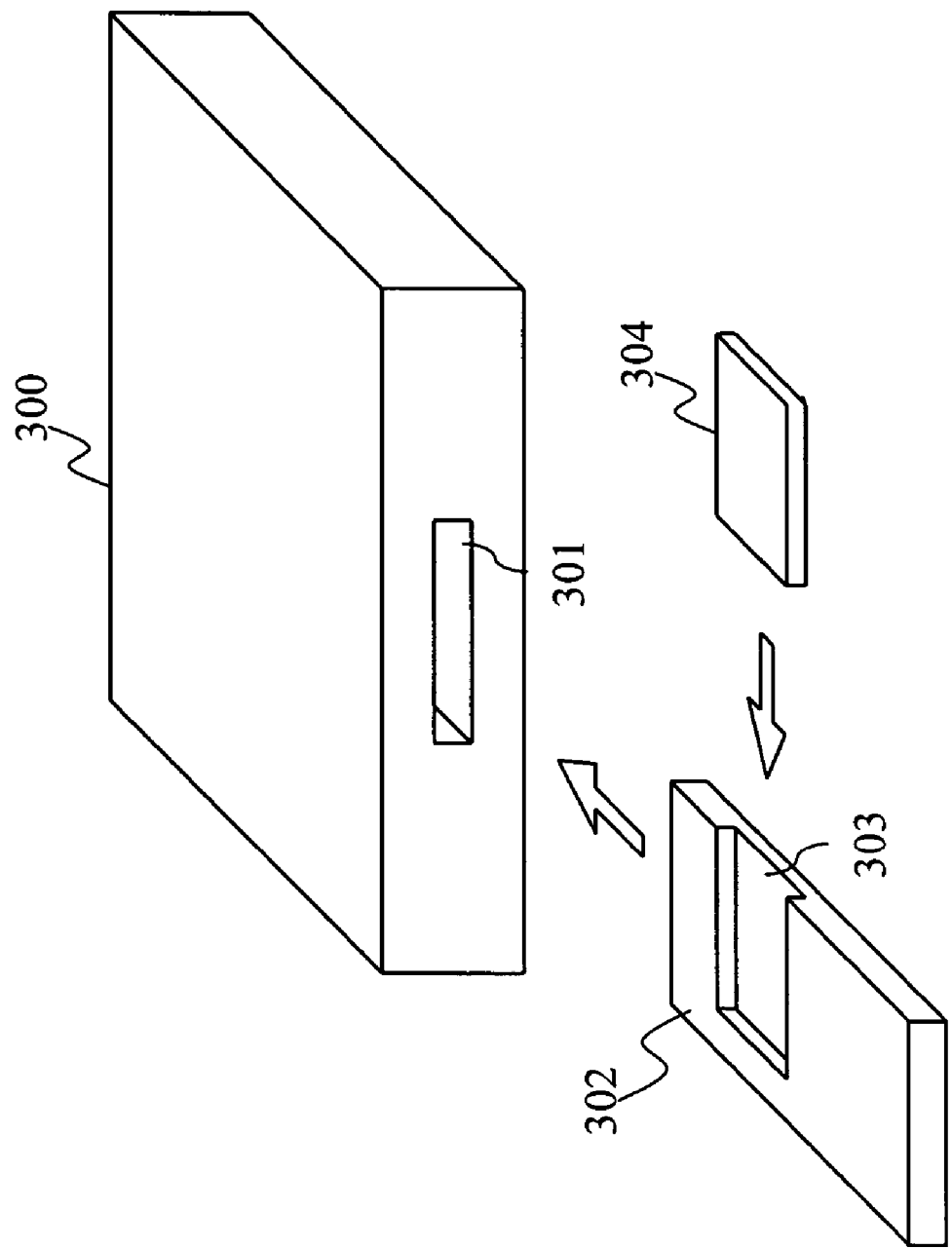
FIG. 3 is a schematic view according to the invention that has a memory card, an IO card and a host system forming a mechanical coupling.

Refer to FIG. 3 for an embodiment of the method for data transmission between an input-output card with a memory card and a host system according to the invention that depicts the mechanical coupling relationship among a host system 300, an IO card 302 and a memory card 304.

The IO card 302 has a socket 303 to be mechanically and electrically coupled with the memory card 304 and it is different from the prior art disclosed in WO 02/19266 A2. The prior art connects the IO card to the tail end of the memory card which results in a weak mechanical coupling strength and it is especially severe because the IO card is generally larger than the memory card. However, the method adopted by the invention is to form an indented slot on the socket 303 to allow the memory card 304 to be wedged therein. The coupled memory card 304 and IO card 302 will have an improved total mechanical strength while the specification of the memory card 304 does not change, and since the coupling structure is different from the conventional techniques, the memory card may be interchanged or replaced to expand the memory capacity as desired.

The IO card 302 coupled with the memory card 304 may be inserted into an insertion slot 301 of the host system 300 of a portable digital device so that the IO card 302 and the host system 300 are mechanically and electrically coupled. When data are transmitting between the IO card 302 (or the memory card 304) and the host system 300, the host system 300 turns the controller of the IO card 302 to transmitting mode and enables the controller of the IO card 302 to select a data transmission method at the switch. By doing so, the data transmission bottleneck of the conventional techniques can be solved.

Figure 4:
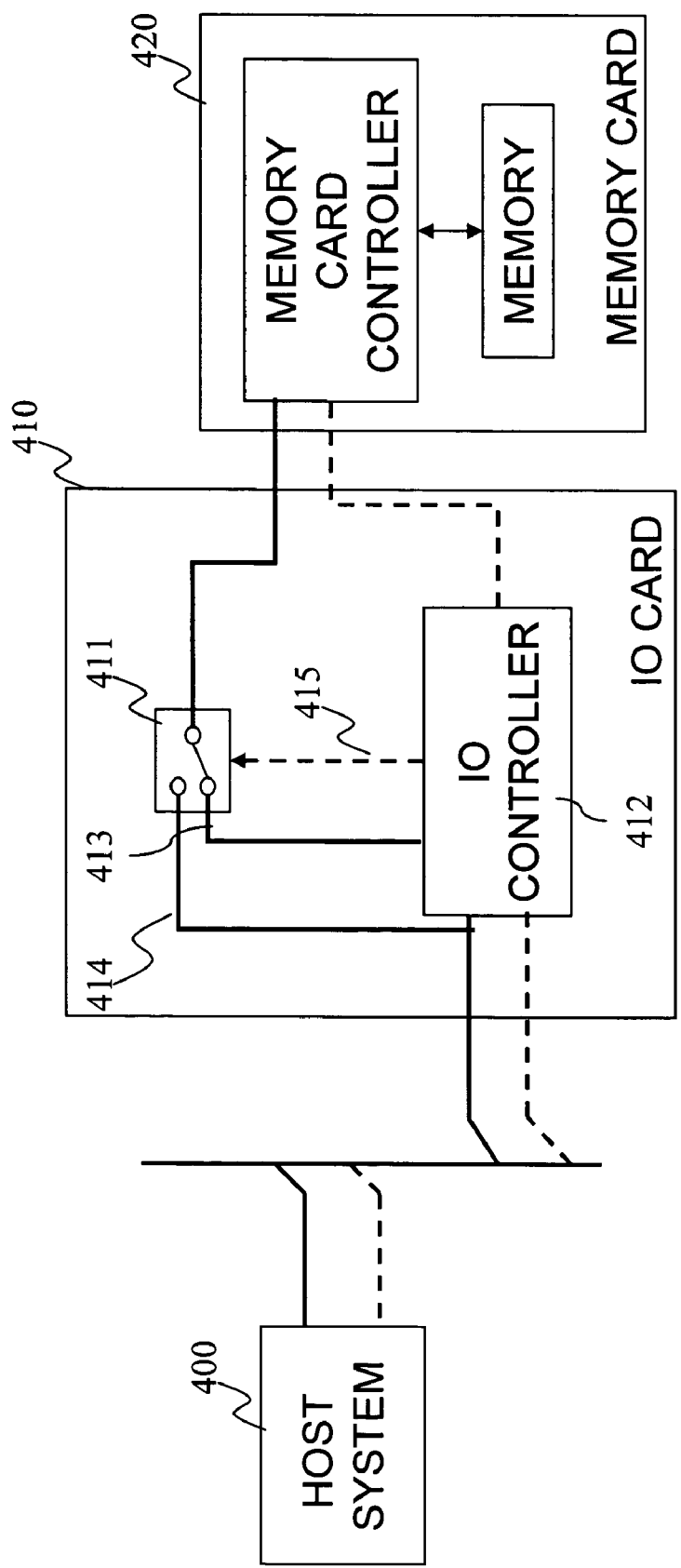
FIG. 4 is a block diagram of the invention showing a data transmission structure.
Figure 5:
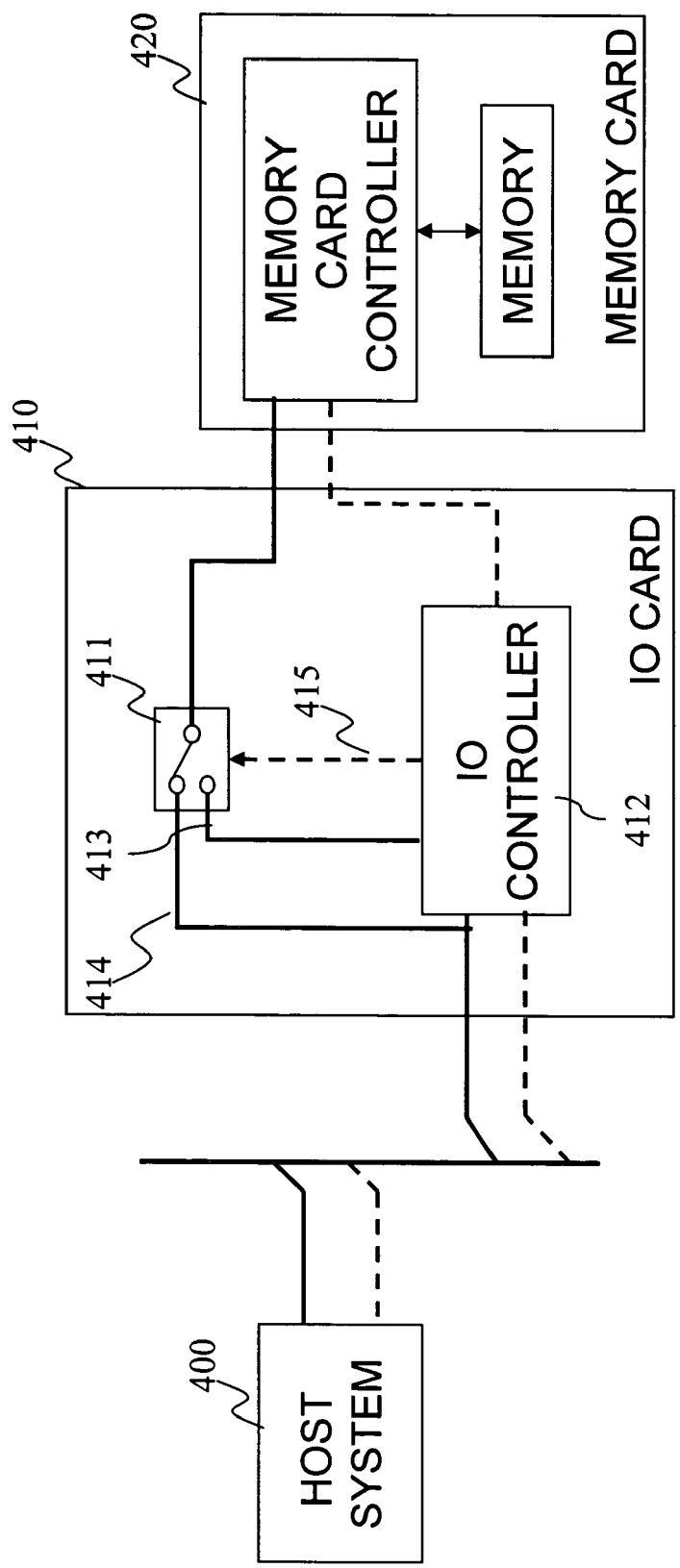
FIG. 5 is a block diagram of the invention showing another data transmission structure.

Refer to FIGS. 4 and 5 for a data transmission structure according to the invention. The broken lines indicate the control signal while the solid lines indicate data buses. Different from the conventional techniques, the present invention discloses an IO card that has a first data bus 413, a second data bus 414 and a switch 411. The switch 411 is controlled by a bus control signal 415 generated by an IO controller 412 to switch between the first data bus 413 and the second data bus 414. The process flows as the following:

1. Passing through the first data bus 413: referring to FIG. 4, when the memory card 420 is connected to the first data bus 413, it is connected to the data bus of the host system 400 through the IO controller 412. Hence, the data buses in the memory card 420 and the IO card 410 may transmit data directly at a faster speed without passing through the data bus of the host system 400. Further, by sharing all of the data buses in the IO card 410 between itself and the memory card 420, data are interactively transmitted with the host system 400.

2. Passing through the second data bus 414: referring to FIG. 5, the memory card 420 employs a portion of the data buses of the IO card 410 to transmit data with the host system 400. The IO card 410 then uses the remaining data buses to transmit data with the host system 400.

Compared with the conventional techniques, the method provided by the invention uses the IO controller to control the switch to change the data transmission path. By doing so, it provides an improved multiplex transmitting efficiency.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments that do not depart from the spirit and scope of the invention.

What is claimed is:

1. A method for data transmission between an IO (input-output) card with an add-on memory card and a host system, comprising the steps of:
    providing the IO card with a socket therein;
    inserting the memory card entirely into the socket of the IO card;
    connecting the IO card to the host system; and
    generating a bus control signal by an IO controller on the IO card after the host turns the IO controller to a transmitting mode and enables the IO controller to select a data transmission method through an IO controller on the IO card to selectively switch to a first data bus or a second data bus located in the IO card thereby to change data transmitting path between the memory card and the host system,
    wherein the first data bus connects the memory card directly to the host system and the second data bus connects the memory card to the host system and the IO card through the IO controller.

2. The method of claim 1, further comprising
    directly connecting the first data bus and the second data bus to the host system, and
    controlling a switch based on the bus control signal to selectively directly connect the inserted memory card to one of the first and second data bus.

3. The method of claim 1, wherein the memory card and the IO card further transmit data directly via the second bus without passing through a data bus of the host system.

4. The method of claim 1, wherein the memory card uses a portion of the data buses of the IO card to transmit data with the host system when the memory card is connected to the second data bus to transmit data, the IO card uses remaining data buses to transmit data with the host system.

5. The method of claim 1, wherein the IO card has a socket to electrically and mechanically couple with the memory card.

6. The method of claim 1, wherein the host system has an insertion slot to electrically and mechanically couple with the IO card.

7. A method for data transmission between an IO (input-output) card with an add-on memory card and a host system, the memory card being inserted in the IO card which is connected to the host system, the method comprising:
    providing the IO card with a first data bus and a second data bus, the first data bus and the second data bus being directly connected to the host system;
    providing a switch to selectively directly connect the inserted memory card to one of the first and second data bus; and
    generating a bus control signal by the IO controller after the host turns the IO controller to a transmitting mode and enables the IO controller to select a data transmission method through an IO controller located in the IO card, thereby controlling the switch to selectively directly connect the inserted memory card to one of the first and second data bus,
    wherein the first data bus connects the memory card directly to the host system and the second data bus connects the memory card to the host system and the IO card through the IO controller.

8. The method of claim 7, wherein the memory card and the IO card further transmit data directly via the second bus without passing through a data bus of the host system.

9. The method of claim 7, wherein the memory card uses a portion of the data buses of the IO card to transmit data with the host system when the memory card is connected to the second data bus to transmit data, the IO card uses remaining data buses to transmit data with the host system.

10. The method of claim 7, wherein the IO card has a socket to electrically and mechanically couple with the memory card.

11. The method of claim 7, wherein the host system has an insertion slot to electrically and mechanically couple with the IO card.

12. The method of claim 1, wherein when the second data bus is switched, the memory card employs a portion of the data buses of the IO card to transmit data to the host system.

13. The method of claim 1, wherein when the first data bus is switched, the IO card and the memory card share all data buses of the IO card to interactively transmit data to the host.

14. The method of claim 7, wherein when the second data bus is switched, the memory card employs a portion of the data buses of the IO card to transmit data to the host system.

15. The method of claim 7, wherein when the first data bus is switched, the IO card and the memory card share all data buses of the IO card to interactively transmit data to the host.

* * * * *